Sept. 8, 1953  J. I. YELLOTT  2,651,176
COAL FIRED GAS TURBINE POWER PLANT
Filed Aug. 17, 1946  10 Sheets-Sheet 1
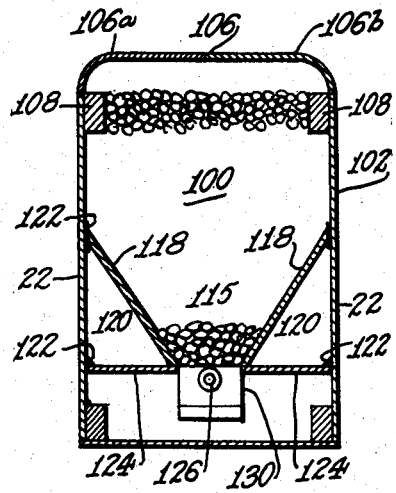
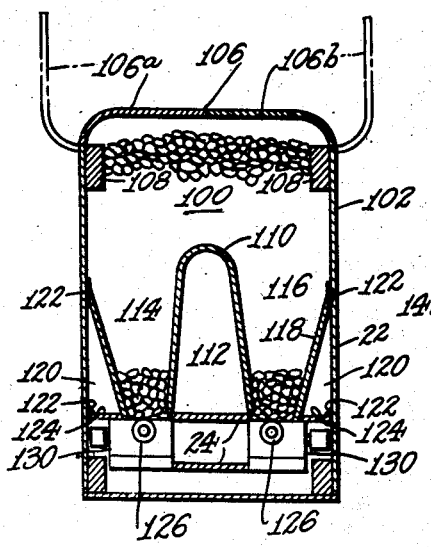
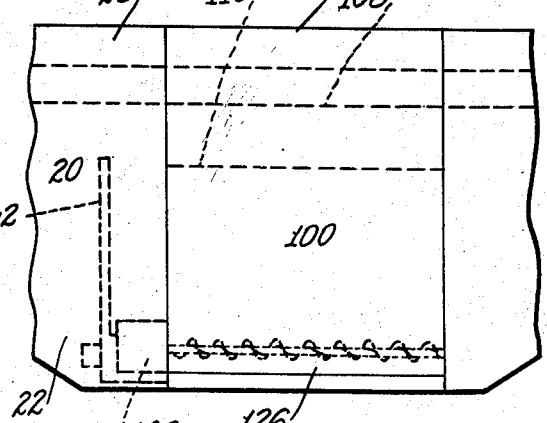
INVENTOR.
JOHN I. YELLOTT
BY
Frederick Griswold, Jr.
ATTORNEY

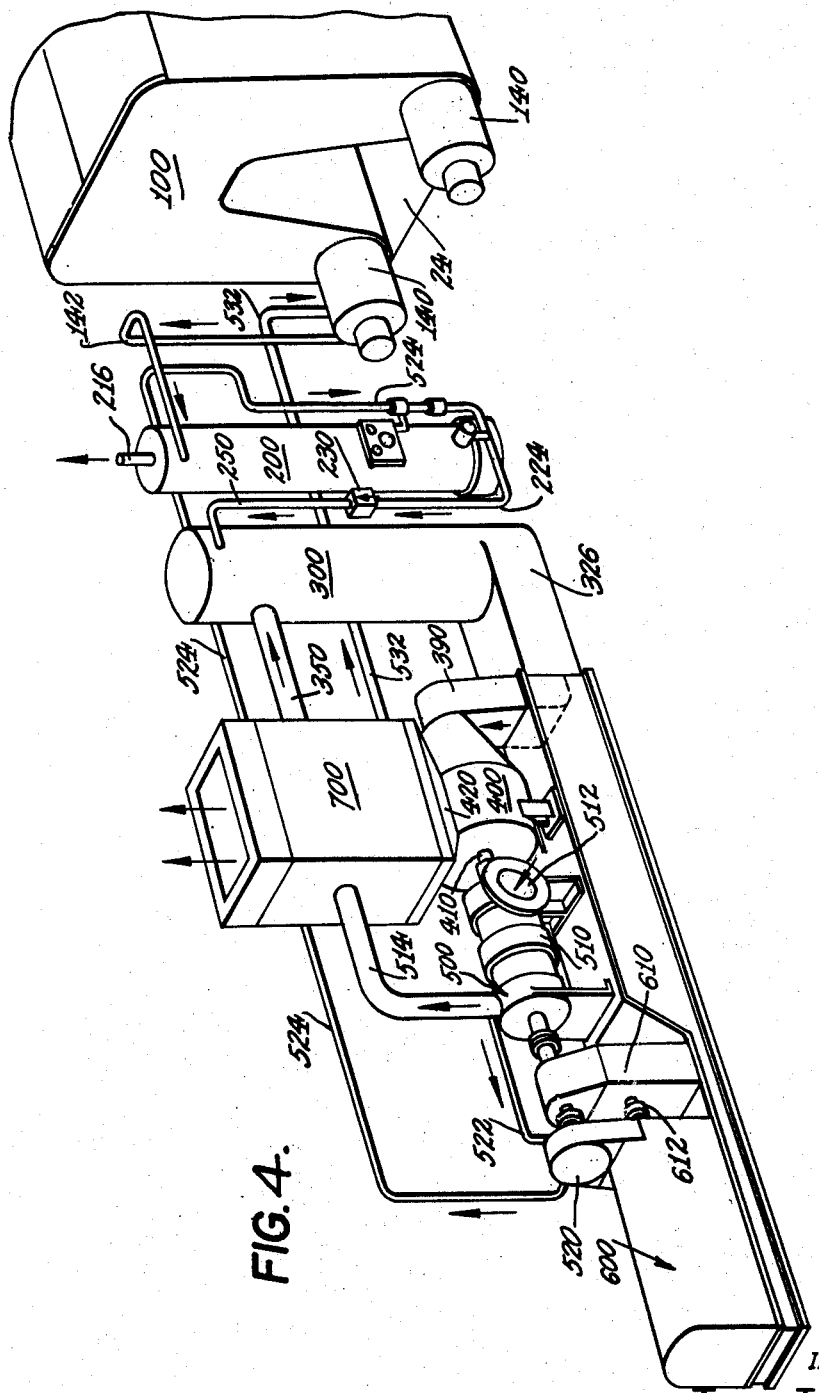

Sept. 8, 1953 — J. I. YELLOTT — 2,651,176
COAL FIRED GAS TURBINE POWER PLANT
Filed Aug. 17, 1946 — 10 Sheets-Sheet 5

INVENTOR.
JOHN I. YELLOTT
BY
Frederick Griswold, Jr.
ATTORNEY

Sept. 8, 1953   J. I. YELLOTT   2,651,176
COAL FIRED GAS TURBINE POWER PLANT
Filed Aug. 17, 1946   10 Sheets-Sheet 6

INVENTOR.
JOHN I. YELLOTT
BY Frederick Griswold, Jr.
ATTORNEY

Sept. 8, 1953  J. I. YELLOTT  2,651,176
COAL FIRED GAS TURBINE POWER PLANT
Filed Aug. 17, 1946  10 Sheets-Sheet 7
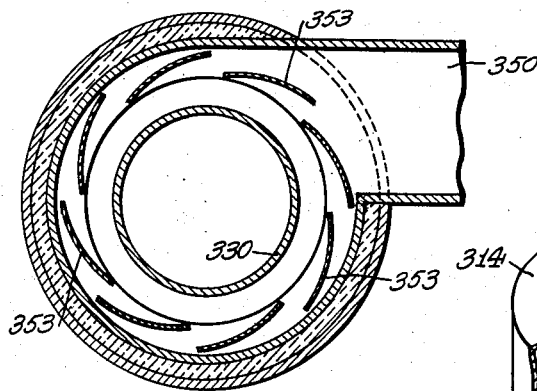
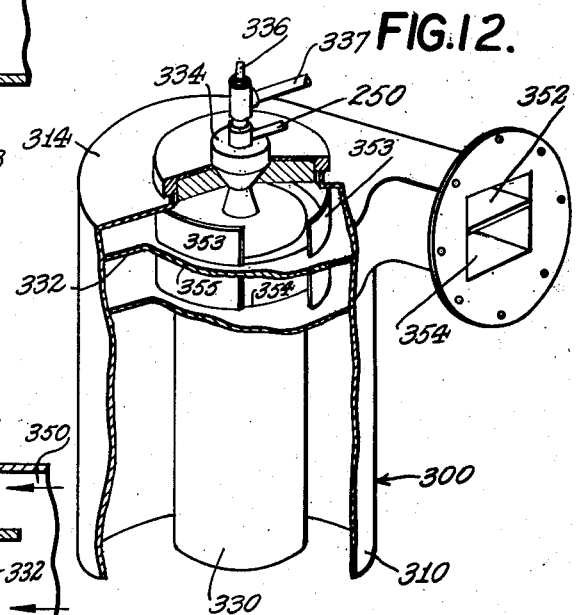
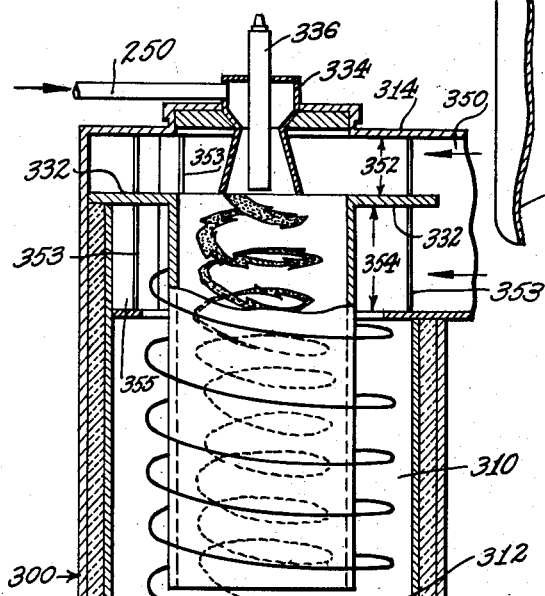
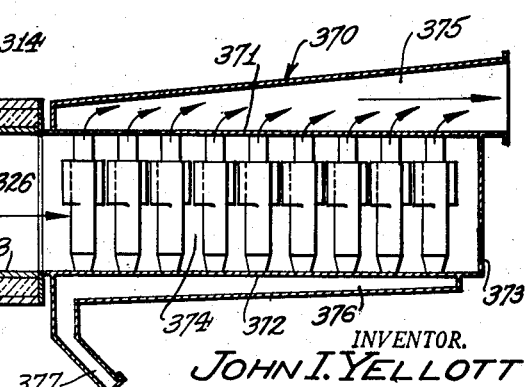
INVENTOR.
JOHN I. YELLOTT
BY Frederick Greenwald, Jr.
ATTORNEY Sept. 8, 1953  J. I. YELLOTT  2,651,176
COAL FIRED GAS TURBINE POWER PLANT
Filed Aug. 17, 1946  10 Sheets-Sheet 9

INVENTOR.
JOHN I. YELLOTT
BY
Frederick Griswold, Jr.
ATTORNEY

Sept. 8, 1953 — J. I. YELLOTT — 2,651,176
COAL FIRED GAS TURBINE POWER PLANT
Filed Aug. 17, 1946 — 10 Sheets-Sheet 10

Mollier Diagram for the Open Cycle Gas Turbine

Turbine Work = 140.6 Btu/lb    Cycle Efficiency = $\frac{52.4}{180.0} \times 100$
Compressor " = 88.2 "          = 29.0%
Net Power    = 52.4 "          (Neglecting Losses)

INVENTOR.
JOHN I. YELLOTT
BY Frederick Grinnell, Jr.
ATTORNEY

Patented Sept. 8, 1953

2,651,176

UNITED STATES PATENT OFFICE 2,651,176

COAL FIRED GAS TURBINE POWER PLANT

John I. Yellott, Baltimore, Md., assignor to Bituminous Coal Research, Inc., Washington, D. C., a corporation of Delaware Application August 17, 1946, Serial No. 691,307

2 Claims. (Cl. 60—39.46)

This invention relates to improvements in gas turbine power plants, and, more particularly, to coal-fired, gas-turbine-electric generator power plants.

Among the features of novelty and advantage of the present invention are coal-fired, gas-turbine power plants in which the coal is carried, pneumatically, for delivery to combustors provided with pneumatic coal pulverizers, after treatment in crushing or pulverizing equipment. The powdered coal is handled and burned in a closed pressure system, the products of combustion being delivered to high-speed gas turbines coupled to electrical generators or mechanical power equipment.

Special features of novelty and advantage include equipment for fly ash removal and elimination of soot, cinders, and like products of combustion.

Another feature of novelty and advantage of the invention herein resides in a special coal burning power plant having a low operating cost; using no water; and having relatively few moving parts to maintain.

The gas-turbine power plant herein is characterized by further advantages in that the weight of the equipment is less than one-half of steam equipment of the same operative capacities, and considerably under that of diesel-electric equipment.

Other features of novelty and advantage of the invention herein reside in the use of coal-fired gas-turbines for stationary power plants, especially in regions lacking a water supply; and as motive power for marine propulsion.

Additional features of novelty and advantage reside in the special fuel-handling and power-generating equipment, of reduced size and weight, with a maximum delivery of power generated, and including maintenance of auxiliary heating services, without requiring special equipment, or the burning of additional fuel, as is now the case.

These and other desirable features of novelty and advantage of the present invention will be described in the accompanying specification, certain preferred forms of equipment being illustrated in the drawings, by way of example only, for, since the underlying principles may be incorporated in other power-generating equipment, it is not intended to be limited to the forms here shown, except as such limitations are clearly imposed by the appended claims.

In the drawings, like numerals refer to similar parts throughout the several views, of which:

Fig. 1 is a vertical cross section of a double-hopper bunker;

Fig. 2 is a vertical cross-section of a single hopper bunker;

Fig. 3 is a side view of the bunker of Fig. 1;

Fig. 4 is a perspective view, in enlarged detail, of a preferred form of a power plant;

Fig. 10 is a vertical section, Fig. 11 is a horizontal section, and Fig. 12 is an elevation, partly in broken section, of one form of pressure combustion chamber;

Figure 5:
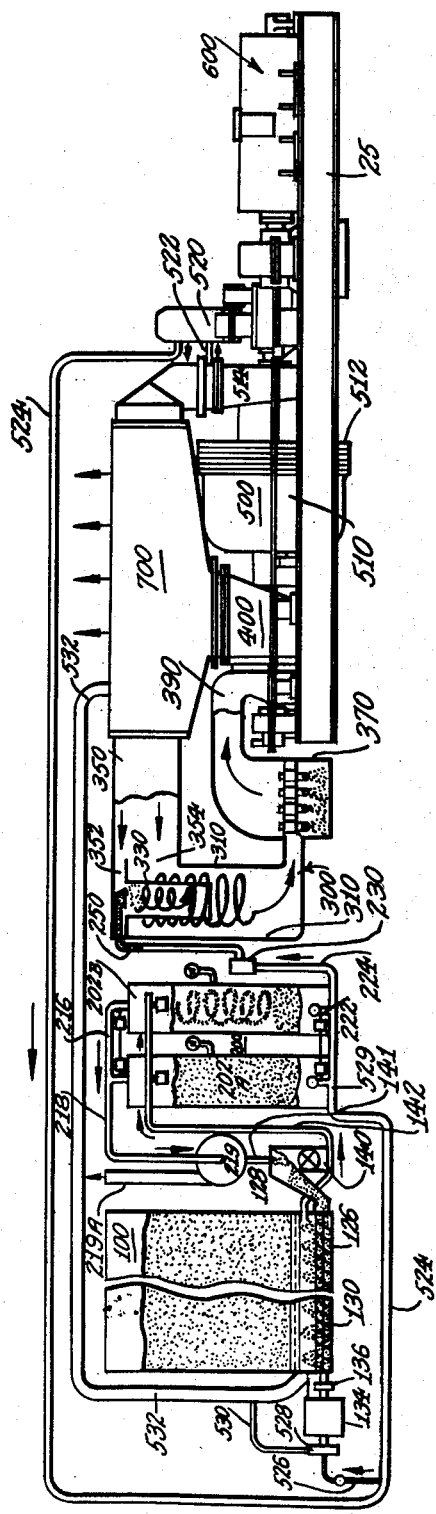
Fig. 5 is a diagrammatic showing of a coal-burning gas-turbine for locomotive service.

The equipment illustrated in Fig. 4, comprises a pair of power units fed by a divided coal bunker 100 (Fig. 1). Each power unit includes a pressure tank 200 for receiving crushed fuel, combustor 300, gas turbine 400, air-compressor system 500, generator 600, and regenerator 700.

In the operation of a power system according to the present invention, coal is fed from bunker 100, through a suitable mill or grinder 140, to pressure hoppers 200, from which it is delivered, under pressure, to the combustor 300. The gaseous products of combustion are delivered from the combustor to the gas-turbine 400, the fly ash being separated en route. The gaseous products of combustion are discharged from the turbine and are vented to the atmosphere through regenerator 700. The turbine and the compressors, designated generally by numerals 400 and 500, are mounted on a common shaft 410 which is coupled to generators 600 in any suitable manner, as through a gear box 610. The equipment is essentially controlled by suitable throttle means controlling the feed of the pulverized fuel, under pressure, to the combustor. Because of the operative characteristics of the gas-turbine, the power developed can be readily controlled by controlling the fuel input.

The special cooperative features of the several elements entering into the novel combination herein will be considered in detail under appropriate headings.

The preferred form of the bunker 100, and particularly adapted for locomotive use, as shown in Fig. 1, comprises a closed compartment having side walls 102 coextensive with, or formed as a part of, the side walls 22 of a locomotive, together with end walls 104, and a roof 106. The roof 106 will be flush with the roof 23 of the locomotive, and is comprised of a pair of doors 106A, 106B mounted on side framing members 108 and controlled by suitable mechanism from the control cab. The doors or covers 106A, 106B, are fitted, in mating fit, so as to afford a substantially hermetic seal or cover for the bunker. The bunker (Fig. 1) is divided, on a central longitudinal axis, by an arched passageway or U-shaped sheet 110, defining a passageway 112 with the floor 24. The arch 110 divides the bunker into two symmetrical hoppers 114, 116. The outer walls of the hoppers are formed by plates 118 set at an angle of 26° or more to form compartments 120 with the side walls 22 of the locomotive. Plates 118 are secured to the cooperating sheets in any suitable manner, as by welding, indicated generally at 122, to form hermetic seals. With this construction, the compartments 120 will serve as water compartments to provide the necessary water for heating the train and for lavatory services. A great saving of weight and space is effected in the present system because of the fact that no separate water tenders are needed for supplying water for power purposes.

In the single hopper bunker shown in Fig. 2, a single tapering hopper 115 is formed by the usual slanting side elements 118, and this hopper feeds the usual screw feed 126. The construction elements of this type of hopper are substantially the same as those illustrated in Fig. 1, for the double hopper bunker, and they will not be described any more in detail.

The bottom of the compartment 120 is preferably formed by separate plates 124. The bottom of the hoppers 114, 116, are formed as troughs 130, and suitable feed plates 128 (Fig. 5) may be used to separate the trough from the hopper proper.

Figure 13:
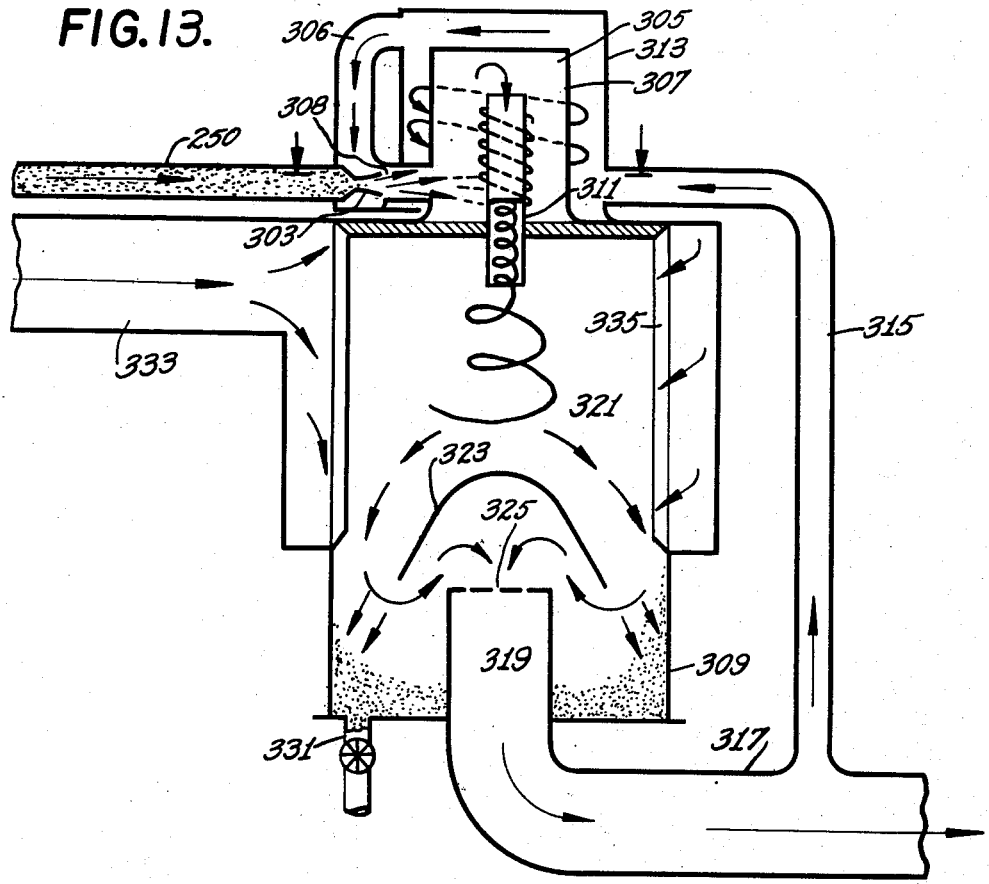
Figs. 13 and 14 are schematic showings, in vertical and horizontal section, of another pressure combustion chamber.
Figure 14:
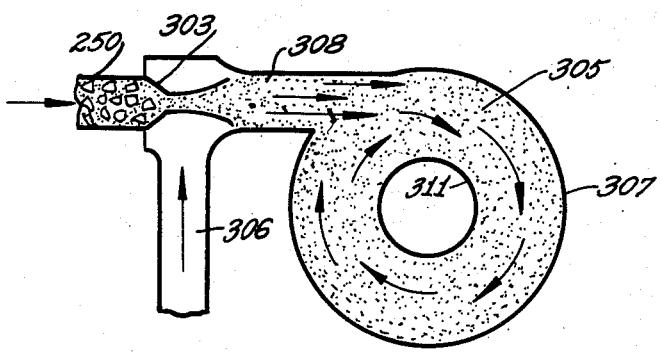

Each hopper is provided with a trough 130 fed by bunker feeders comprising screws 126 mounted on shafts 132 which are coupled to motors 134 through couplings 136 (Fig. 5). The screw 126 delivers the coal from the hoppers into combination crushers and dryers designated generally by the numeral 140. The crushed and dried fuel is conveyed by a pneumatic conveyor 142 to a pressure hopper or hoppers, designated generally by the numeral 200. Pressure hoppers may be used singly or in tandem, and the preferred construction of the hoppers is indicated in Figs. 13 and 14.

Figure 6:
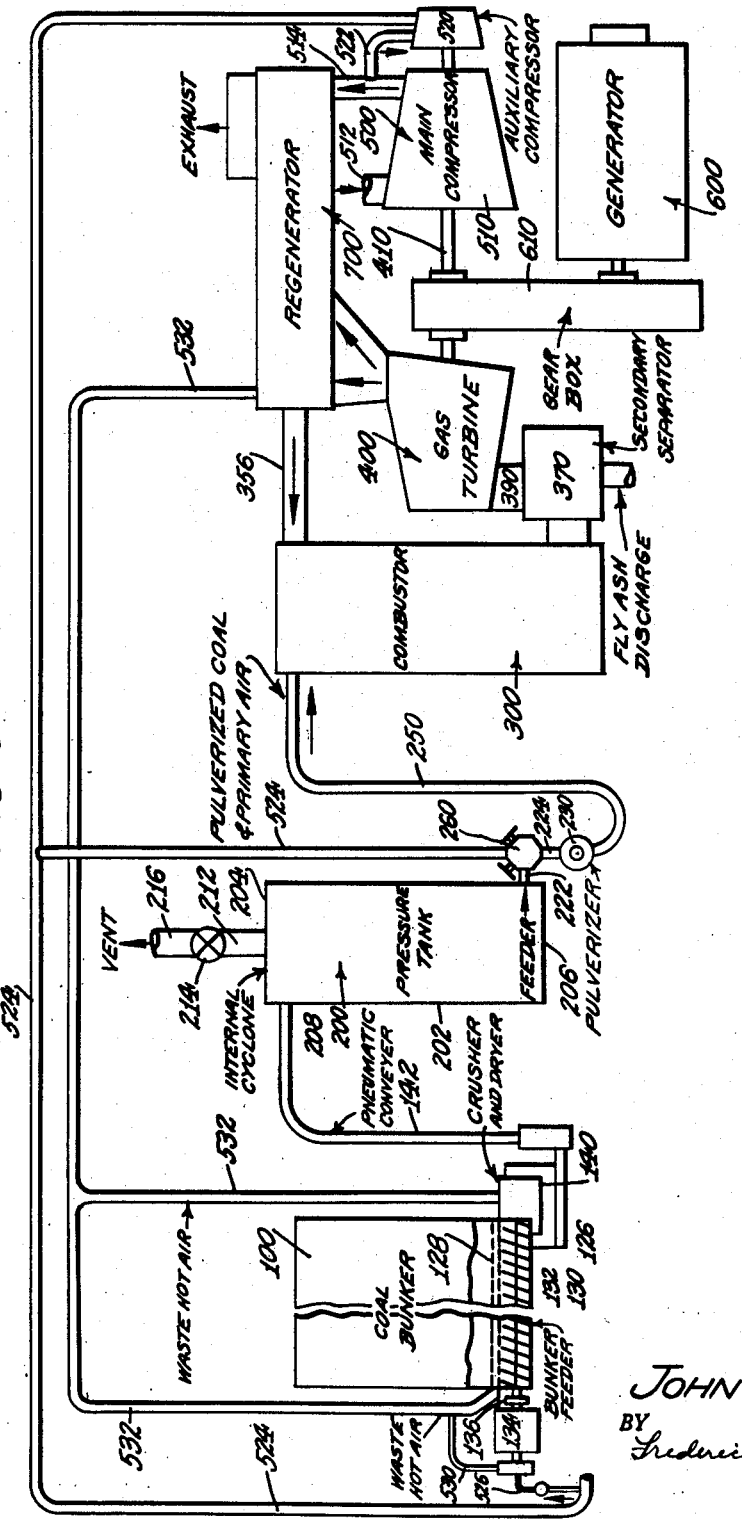
Fig. 6 is a view similar to Fig. 4 showing another form of coal-burning gas-turbine system.
Figure 8:
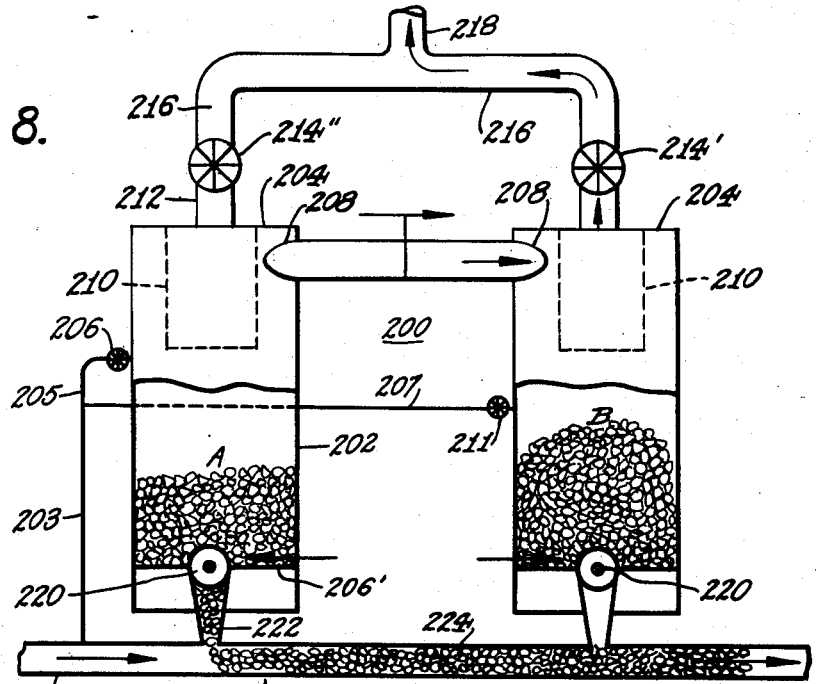
Figs. 8 and 9 are schematic views showing pressurized coal feeders.

Referring initially to Fig. 8, a storage tank 202 is provided with a top closure 204 and a bottom closure 206. A fuel inlet or opening 208 is provided in the side wall adjacent the top and is adapted to deliver a tangential stream of crushed coal and air into the chamber. A hollow cylindrical baffle, 210, shown in dotted lines, is secured to the under side of the top 204 and is provided with an outlet pipe 212 having a valve 214 discharging into a vent pipe 216, which is connected to an exhaust suction, not shown. At the bottom of the chamber a screw feeder 220 discharges through conduit 222 into manifold 223 and delivery pipe 224, and thence through pulverizer 230 (see Fig. 6) and delivery pipe 250 into the combustor 300. The hoppers 202 may be supplied with pressure air through supply line 203 having branches 205, 207 respectively controlled by valves 209, 211.

In the form of the device shown in Fig. 8, the left-hand chamber is discharging, while the right-hand chamber is being filled with crushed or comminuted fuel. The valve control or controls of the inlet pipe are so arranged as to close off the left-hand container and permit ingress or discharge of air and fuel to the right-hand container. The valve 214′ of the right-hand chamber is open, while the valve 214″ of the left-hand chamber is closed. The air inlet valve 209 is open, placing the left-hand chamber under compression, and the feeder screw 220 is set in operation so as to discharge the fuel under pressure into the line 224 leading to the pulverizer and combustor. While the left-hand chamber A is discharging, the right-hand chamber B is being filled. The air-borne crushed or comminuted fuel is discharged into the top of the chamber and spiralled toward the bottom, discharging the solid particles, while the air, freed from its contained dust or fuel particles, passes out through tube 216 and thence through vent 218 to the atmosphere. When chamber B is filled, its controls are reversed as are those of chamber A, and the chamber B will discharge into the combustor feed line while chamber A is being filled. This system permits the continuous supply of the aeriform or fluidized combustible, under pressure, into the combustion zone.

Figure 9:
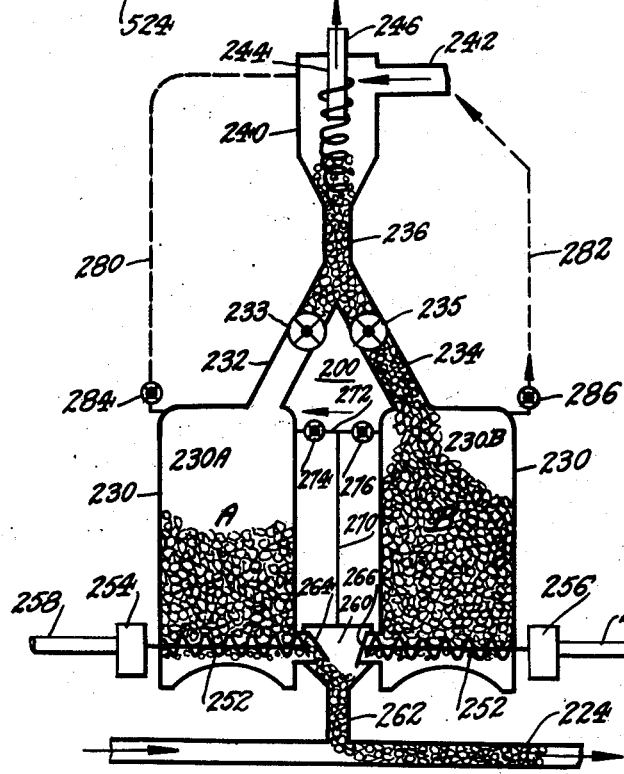

In the form shown in Fig. 9, a pair of pressure chambers 230A and 230B are coupled through feed lines 232, 234 to the downcomer 236 of an inverted Y coupling connected to the conical bottom outlet of separator 240. The inlet pipes 232, 234 are severally provided with valve controls 233, 235. Cyclone separator 240 is provided with an inlet pipe 242, and an internal pipe 244, depending into the cyclone separator chamber below the inlet pipe and having an outer extension 246 venting to the atmosphere. The pressure chambers 230A, 230B are severally provided with screw feeders 251, 252 powered by motors 254, 256 having power leads indicated generally at 258. The screw feeders discharge comminuted fuel into a common discharge chamber 260, and thence through pipe 262 and line 224 into pulverizer 230 and outlet pipe 250 into the combustion chamber. Feeders 251 and 252 are severally closed by flap valves 264, 266, and pressure line 270 is connected from chamber 260, through a T connection 272, to the upper end of the chambers 230A, 230B. The arms of the T are severally closed by valves 274, 276. Bleeder lines 280, 282 are connected between the upper portions of the chambers 230A, 230B and the cyclone separator 240, as illustrated, and are controlled by valves 284, 286.

The operation of the system of Fig. 9 will be seen to be similar to that of the system of Fig. 8, although affording certain advantages in utilizing common separating and discharge mechanisms, with consequent savings in space and weight. In the operation of the system as shown in Fig. 9, the left-hand chamber is discharging into the combustion line while the right-hand chamber is being filled. Under these circumstances, valves 233, 284 are closed, sealing off the chamber, and valve 274 is open. The pressure air in pipe 224 will maintain the chamber 260 (and the line 270) under compression, so that with the valve 266 shut, and valve 264 open, the chamber 230A will be maintained at the same pressure as obtains in pipe 224. Motor 254 being set in operation, the fuel will be discharged through flap valve 264 into chamber 260 and thence into pipe 224. While chamber 230A is being discharged, chamber 230B is being filled. Here valve 235 is open, as is valve 286, thus establishing pneumatic balance between the chamber and the cyclone separator 240. The comminuted fuel fills the chamber B, the flap valve 266 being shut by the pressure of air in chamber 260. When the chamber 230B is filled, the valves 235, 286 are closed, valve 276 is open and motor 256 is started thus feeding the fuel, under pressure, into the pressure line 224. At the same time, the controls of chamber 230A are reversed, and it is filled up in the usual manner.

*Combustor operation*

The combustor system herein comprises essentially a pressure feed inlet for comminuted fuel incorporating a convergent nozzle pulverized 230, or other suitable pulverizing device, a combustion chamber, including a conduit discharging into a fly ash separator, and a conduit for discharging the products of combustion, free from fly ash, into a gas turbine. As shown schematically in Figs. 5, 7 and 10 to 13, the system comprises a combustor 300, an air supply means 350, and an ash separating device 370, together with an outlet flue or pipe 390. The combustor 300 comprises a main chamber 312 (Fig. 10), of generally L shape, with an outer wall 310, which is composed of an outer shell 314 of carbon steel, or other suitable material, an inner insulating lining 316, and an inner heat-resistant steel liner 318. The combustion chamber proper comprises an inner cylindrical shell 330, of heat-resistant steel, flanged at its upper end, as indicated at 332, and mounted on the outer wall 310 of the combustor. A burner 334 is mounted at the top of the chamber and is provided with a suitable igniter 336. The air inlet passage or duct 350 is divided by flange 332 into two feed zones 352, 354 to set up a downwardly spiralling vortex extending the length of the combustor. The combustion air, fed through duct 352, will discharge in a spiral path into primary combustion chamber 330 through louvres 353, while the cooling or diluting air will discharge from inlet 354 through louvres 355 into the upper part of the main chamber 312 outside of the inner, heat-resistant steel shell. The pressurized air-borne supply of comminuted fuel is passed through the flash pulverizer 230 and pipe 250 into the combustion chamber 330. The pulverized fuel, admixed under pressure with primary air, which is supplied in quantity sufficient for complete combustion of the fuel, is burned in combustion chamber 330, the flame taking the downward path illustrated, a spiral flow being set up and maintained by the air flow introduced through the vanes 353. As shown in Fig. 12, the combustion chamber may be provided with a pilot fuel inlet, indicated generally by the numeral 337. At the lower open end of the combustion chamber, the completely combusted gases and entrained fly ash are mixed with another descending mantle or envelope of cooling air, which is supplied in quantities sufficient to reduce the temperature of the gases down to the operative optimum for the particular turbine equipment in use. The interior of the combustor will be seen to provide an inner combustion zone 330, an outer cooling zone 312, and a lower mixing zone 324 for the products of combustion and the cooling air, and a discharge zone 326 discharging the resulting motive fluid into the fly ash separator 370. Separator 370 comprises a box-like member having spaced top and bottom walls 371, 372, and a closed end wall 373 defining a central chamber 374 in free communication with the discharge outlet 326 of the combustor. A battery of small cyclone separators are mounted in the casing between the walls 371, 372, discharging clean combusted gases into an upper take-off chamber 375 and fly ash into a lower dust discharge channel or chamber 376, which may be provided with a descending dust discharge pipe 377, and a control or outlet valve 378.

In the form shown in Figs. 13 and 14, there is illustrated a cyclone combustor which is adapted for the pregasification of flash-pulverized coal with highly preheated air. In the system shown in Fig. 13, pressurized air-borne comminuted coal is introduced through pipe 250, and flash pulverizer nozzle 303 directly into gasification chamber 305, comprising a closed cylindrical chamber 307, mounted on a cylindrical combustion chamber 309. The chamber 307 is provided with a central tube 311 which passes through the roof of the combustion chamber and extends well up into the gasification chamber. A second shell 313 is mounted over and spaced from chamber 307. This chamber is connected through pipe 315 to combustion gas outlet pipe 317, which is connected through an elbow bend 319 to the combustion chamber 321 formed in chamber 309. A deflector 323 is provided over the mouth of pipe 319 and the latter may also be provided with a screen 325. The chamber 309 may be provided with a fly ash draw-off, indicated generally at 331. Secondary air is introduced through pipe 333 and louvres 335 into the combustion chamber. A by-pass 306 connects the preheating chamber 313 with a gasification chamber 305 through duct 308 into which flash pulverizer 303 discharges.

The operation of the system shown in Figs. 13 and 14, is relatively simple and affords distinct advantage by requiring a minimum of space for combustion and ash removal.

In the combination gasifier and vortex combustion chamber, a pressurized stream of air-borne comminuted coal is flash-pulverized into a preheating chamber, ascending in a spiral to the inlet of the downcomer or discharge tube, and thence into the combustion chamber. In the combustion chamber, the highly preheated air-fuel mixture spins inside of a descending vortex created by the secondary air introduced through the vertical louvres of the combustion chamber. The louvres are so adjusted that the air is distributed vertically and is continuously spinning. The spinning and continuously descending pressurized column or cylinder of air-diluted products of combustion, with which is entrained fly-ash from the combusted fuel, is driven to the bottom of the combustion chamber. The resulting highly heated motive gas streams pass up under the deflector and thence out through the downcomer or motive gas discharge to the gas turbine. Because of the spinning action, the fly ash will be deposited in the bottom of the combustion chamber, the top of the outlet pipe being placed well above the bottom to prevent entrainment of any deposited ash, which is removed as desired. A by-pass pipe 315 connects the motive gas outlet with the shell of the preheater. By the injection of the air-borne streaming entrainment of coal particles into the preheater chamber, hot air (motive gas) is drawn through the bypass, around the shell, and into the preheater, thus preheating and partially gasifying the pulverized coal. The hot air supplied to the preheater will be at a temperature of 1300° F., or thereabouts, depending on the temperature of the gases discharged from the combustor, which depend in turn on the amount of cooling air admixed with the primary combustion gases. By the use of this system and the one described in Figs. 10 to 12, a maximum yield of motive gases, i. e. compressed air blended with heated and properly tempered combustion gases, is formed and delivered, under pressure, in an apparatus requiring a minimum of overall size for the weight or tonnage of coal handled. By the provision of descending vortical combustion and cooling columns in cylindrical apparatus, the size of the latter is reducible to an absolute minimum, while maintaining the necessary length or path for travel of the particles to be burned to permit the proper and complete combustion of the same. Additionally, due to the fact that the system is maintained under pressure, the combustion of the fuel particles is greatly facilitated and speeded up so that the usual enormous bulk of equipment required in conventional gas producers and other like units is completely done away with. The advantages of this type of construction are further enhanced by a provision of regenerative heating of the air supply for combustion, and for cooling or diluting the primary products of combustion. Likewise waste hot gas can be supplied for the purpose of drying and conveying the initially ground or comminuted fuel supplied to the storage hoppers.

Figure 17:
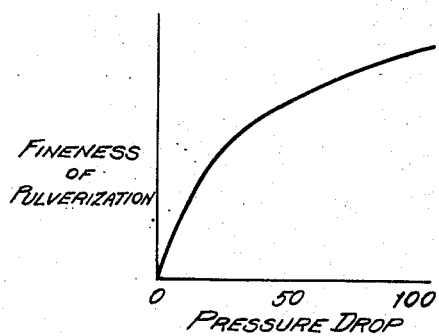
Figs. 17 and 18 are graphs showing the operation of the devices of Figs. 15 and 16, with fineness of pulverization plotted against pressure drop, and pound of air per pound of coal, respectively.
Figure 18:
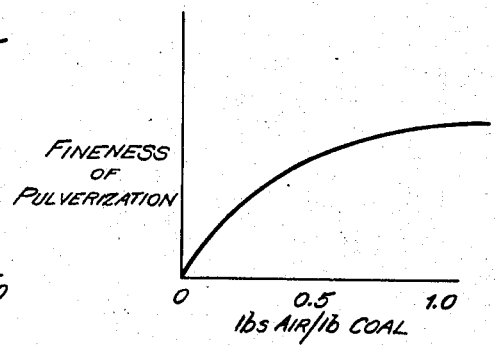

I have found that it is possible to pulverize crushed coal by the simple process of causing it to pass, with compressed air, through a nozzle, where the pressure on the coal particles is released almost instantaneously. The performance of the nozzle, as to fineness of pulverization plotted against the pressure of the air, and plotted against the ratio of air-to-coal, is schematically indicated in Figs. 17 and 18, respectively. The design of the preheater herein to function as a simple attrition device, after the nozzle, enables me to employ as much as possible of the kinetic energy in the coal-air stream, to produce a fuel so fine that 80% will pass through a 325 mesh sieve.

The utility of the preumatic coal pulverized in the gas turbine system can be estimated by comparing first cost and operating and maintenance costs of a mechanical pulverizer, having several moving parts and a large driving motor, with similar parts for an auxiliary compressor, to take air from the main compressor and boost the pressure to perhaps 140 p. s. i. The coal pulverizer, or flash-pulverizer herein, has, of itself, no moving parts, and its operative life is almost indefinite, being conditioned only by a minor degree of abrasion of the nozzle, which can be compensated for or taken care of by using a hard facing material, such as boron carbide or tungsten carbide. Less than 2% of the shaft power of the turbine is required to drive the auxiliary compressor. Thus, the only work which can be charged against the pulverizer is that required to boost the pressure of the combustion air which, when it enters the combustor, joins the rest of the air, and is equally effective in doing work as it passes through the turbine as part of the motive gas cycle.

The specific details of the non-clogging pneumatic coal pulverizer or flash-pulverizer herein will be specifically described with respect to the usual feed pipe 250, but with comminuted coal delivered by the by-pass 253, embodying a screw feeder 255.

Figure 15:
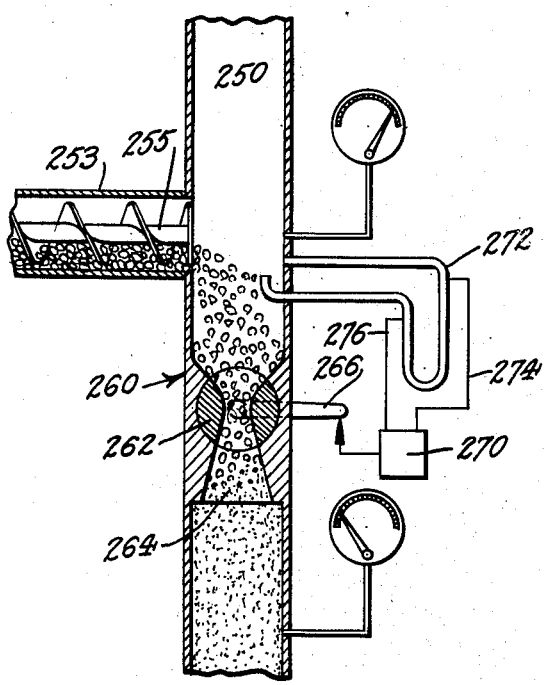
Fig. 15 is a longitudinal section of an asymmetrical flash pulverizer nozzle with automatic controls.
Figure 16:
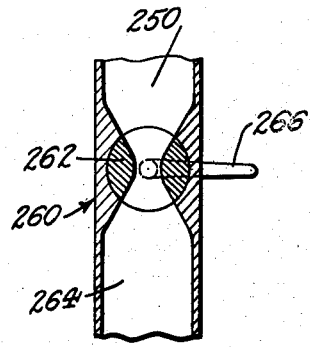
Fig. 16 is a longitudinal section through a flash pulverizer nozzle having symmetrical throat.

The advantages of pneumatic pulverization, as indicated herein, are further enhanced by the utilization of the novel nozzle shown in Figs. 15 and 16.

The operation of the nozzles shown in Figs. 15 and 16 can be well appreciated by referring to the diagrams in Figs. 17 and 18, which indicate the principle of operation of the pneumatic coal pulverizer. Thus in Fig. 17 the fineness of pulverization is plotted against the pressure drop, while in Fig. 18 the fineness of pulverization is plotted against the ratio of pounds of air to pounds of coal.

The improved non-clogging coal pulverizer 260 of the present invention includes a rotary plug 262 mounted in the throat of the nozzle 264. The nozzle of the flash pulverizer, as previously indicated, may be mounted in the inlet line 250 to the combustor, but is desirably mounted immediately at or discharging directly into the preheating chamber, and usually laterally or tangentially thereof to set up an ascending or descending spiral flow of the atomized particles. The nozzle throat may be asymmetrical, as shown in Fig. 15 or truly symmetrical, as shown in Fig. 16, and rotation of the plug by lever 266 will free it of any obstructions, such as over-sized particles which may have escaped the primary grinding or pulverizing.

In the invention herein, crushed coal of 16 mesh, or thereabouts, air-borne in a stream of heated air or steam, at 120–140 lbs. per square inch pressure is passed through the nozzle, which is so constituted and arranged as to effect a pressure reduction of the order of 80 p. s. i. down to a pressure approximately as great as that in the combustor.

Under observed conditions of operation, it is found that with 16 mesh particles fed to the high pressure side of the nozzle, the material discharged at the low pressure or outlet side of the nozzle was characterized by a particle size of 200 mesh, for some 65% of the delivered product.

The control of the reversible nozzle may be effected manually by lever 266, or automatically by means of relay and a motor or solenoid, indicated generally by 270, controlled by the pressure drop across a manometer 272 mounted in the atomizing air line 250. Any clogging of the nozzle will so diminish the rate of atomizing air flow as to cause a balancing of the pressure across the manometer 272. Suitable connections 274, 276, either electrical or mechanical, operate appropriate relay and motor or solenoid control devices 270 for reversing the nozzle.

With the devices shown in Figs. 15 and 16, a desired pressure differential or drop of some 80 lbs. can be maintained between the up-stream side of the nozzle and down-stream side. When the coal passes through the nozzle and its pressure changes in 1/10000 of a second from the high upstream pressure to the lower downstream pressure, the coal is pulverized. The fineness depends upon the pressure drop, and the gas to coal ratio.

For gas turbine service the coal must be under pressure in order to enter the combustion chamber. I have determined that an excess pressure of some 80 lbs. air must be maintained on the upstream side to give satisfactory pulverization. Tests with a convergent nozzle pulverizer show that there are certain peculiar properties of the nozzle which are of distinct advantage in the system herein. Using a nozzle which is so constructed that the angle between divergent sides can be varied continuously over a wide range, I have found that, if the angle is adjusted properly, for a given set of conditions, the pressure of air flowing through the nozzle can be made to fall almost to atmospheric pressure, and then to rise again, to approximate the pressure obtaining in the combustion chamber.

Figure 19:
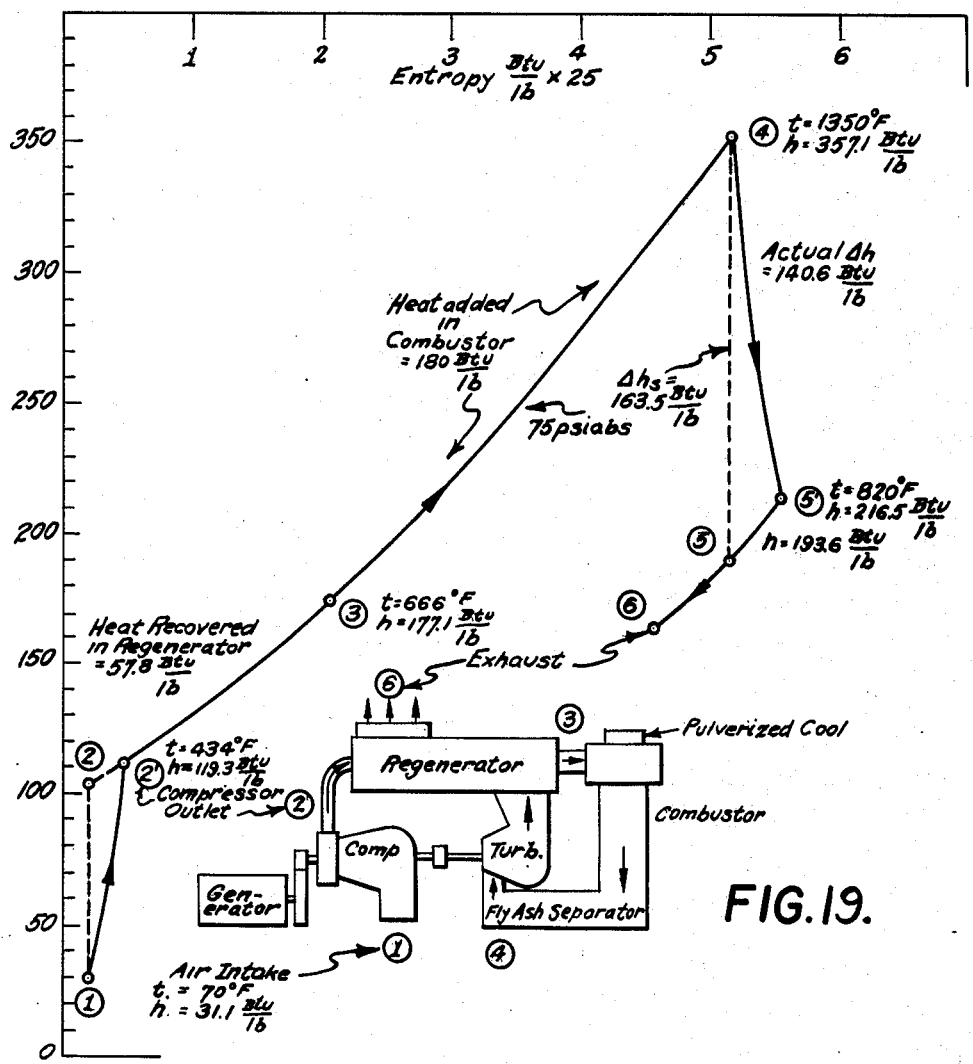
Fig. 19 is a Mollier diagram for the open-cycle gas-turbine.

The gas turbine 400, indicated in Figs. 4, 5, 6, and 7 may be of any suitable construction and preferably designed to operate on the so-called open cycle. Considering the showing in Fig. 19, the open cycle gas turbine may be briefly described as follows:

Air is drawn from the surrounding atmosphere by the main compressor, and its pressure is raised to an appropriate value, usually about 60 to 75 p. s. i. abs. The temperature of this air, already warmed by compression, can be further raised by transferring to it some of the heat which is being discharged from the exhaust of the turbine. The regenerator can, with reasonable surface, recover from 50% to 75% of the available heat in the air leaving the turbine, and it is quite feasible to introduce the compressed air into the combustor at a temperature well above 600° F. The open-cycle combustor is characterized by the direct burning of the fuel with the exact quantity of air required for complete combustion, which volume is a minor portion of the total air supplied. The remaining air is used for cooling the combustion chamber itself, and for subsequent mixture with the products of combustion, to form a motive gas whose temperature is reduced to a level (ca. 1300° F.) at which the turbine can operate safely.

The major problems involved in making the gas turbine burn coal are clearly delineated in Fig. 26, and require that not only must the system be effective for preparing pulverized solid fuel, such as coal, for combustion in such a manner that it can be burned within the limited space available on a locomotive or ship, but the solid residue of the products of combustion must be substantially completely removed in order that the blades of the turbine shall have a reasonable life. The system herein effectively solves this problem and provides a power generating system which is equally adaptable to stationary and marine applications, as well as locomotive purposes, and particularly wherever water is lacking. Even at coal mines, where much power is needed to operate mechanical equipment, good water is usually not available in adequate supply, and the coal-burning gas turbine system herein is especially adapted to serve as an economical prime mover.

The turbine, 400, will be mounted on a horizontal shaft 410 (Fig. 4), and is set on a suitable base 420 which also serves to support the air compressors and generating unit at the other end. The air compressors and generating unit will be in alignment with the turbine, the compressors being mounted on the same shaft and driven thereby. The reduction gear 610 is connected through the coupling 612 to generator 600 which may comprise any specific or desired number of units. As contemplated herein, four 1,000 H. P. generators will deliver about 4,000 electrical H. P. with less than 1 lb. of coal per H. P. hour.

The regenerator 700 is mounted on the turbine casing and connected therewith by means of an exhaust stack 420. As no invention is predicated on the specific construction of the turbine, the details thereof will not be described.

*Air compressor and regenerator*

The feature of the present invention embodying the conveying of the comminuted coal by air is of maximum importance as it accomplishes drying and transferring of the initially crushed coal from the crusher to the pressure hoppers, and from the latter to the combustor. The waste heat of the system may be utilized in various service units including train heating boilers and the like, as will be described more in detail herein.

The air compressor system of the present invention is essentially comprised as follows:

The air supply system, as shown in Fig. 5, comprises an air compressor 510, provided with air intake silencers 512, is driven by shaft 410 of gas turbine 400. This compressor discharges through outlet 514, regenerator 700, and air inlet 350, to the combustor 300. An auxiliary compressor 520 may be mounted on the turbine shaft, and it may be provided with an inlet pipe 522 connecting with the outlet side of the main compressor 510. This auxiliary compressor is provided with an outlet line 524 which connects through intercooler 525, and branch line 524a with the outlet or discharge tube 224 of the pressure storage chamber 200 leading to the combustor 300. A valved branch line 526 connects second leg 524b to engine 134 which drives a coal feeder 130. Line 530 carries the exhaust from this engine into branch 532a of waste heat line 532 which is connected to the turbine exhaust 420.

The main compressor 510 delivers the main charge of air through regenerator 700, whence it passes through pipe 350 into combustor 300. The heated air passes through the turbine and discharges into the regenerator, thence out to the atmosphere, a certain portion thereof being withdrawn through pipe 532 (Fig. 5) and delivered to the coal bunker. The pipe 532 may be forked or branched, and one connection 532a is made to the exhaust of the air-motor 134 which drives the bunker feeder, while another connection 532b is made at the discharge end of the bunker feeder to the crusher and dryer 140. The air delivered into the bunker may be directed to the trough 130 thereof, below the feeder plates 128, and will serve to effect an initial drying of the coal deposited in and conveyed by the screw conveyor 126. At the outlet end of the conveyor, a further quantity of hot air is added and works in the crusher and dryer to complete the drying of the coal, as it is ground to the desired 16 mesh size. Waste hot air may also be supplied to the coal bunker at the top thereof, or any point intermediate the structure, or in both hoppers, where bi-lateral, symmetrical hoppers are used. The coal bunkers being hermetically sealed or closed, and the main air supply being introduced into the trough 130, a negative pressure will be established at the outlet of the pressure tank system sufficient to draw the crushed and dried coal through the pneumatic conveyor 142 into pressure tank system 200.

Air system

In the pressure tank system 200, the waste hot air is separated from the entrained or air borne 16-mesh fuel, and is discharged to the atmosphere through vents 216 by means of suction fan 219. The auxiliary compressor 520 is adapted to deliver air at higher compression than main compressor 510. This high compression air is delivered through pipe 524 (Fig. 7), and discharge manifold 223 of the pressure feeders which are connected through pipe 224, flash pulverizer 230, and feed pipe 250, to combustor 300. Manifold 223 is supplied with crushed coal through feed lines 222.

Considering the general operation of the system, and with particular reference to the air system, and the combustion system, it is to be noted that air compressed to 75 lbs. per square inch, absolute, and heated to 1300° F., drives the turbine. It is noted further that the air required for the transport and flash pulverization of the initially crushed coal is provided by an auxiliary compressor 520. The waste heat from the regenerator is utilized for generating train heating steam and for other services. Waste hot air from the regenerator will be delivered to the coal bunker, serving to dry the coal. A suction fan may be provided for drawing the coal through the crusher and drying the same, as well as conveying the crushed and dried coal into the pressure storage chambers where the air is separated from the entrained particles and vented to the atmosphere. Desirably, such a system will include a means for recovering the fines, as illustrated in Fig. 5. Here the vent pipe 218 discharges into a secondary separator 219 having an outlet 219A. The fines separated out here are returned through pipe 141 to the crusher 140 where they are mixed with freshly ground and dried coal and transported to the pressure storage chambers 200. Air, at 140 lbs. per square inch pressure, serves to transport the ground coal from the storage chambers to the flash pulverizer, where the pressure is dropped to 65 lbs. per square inch, with resulting flash pulverization of the coal which is immediately burned in a special combustion chamber. The products of combustion are diluted with excess air derived from the main compressor and regenerator to reduce the temperature to 1300° F. and form a motive gas to drive the turbine. Because of the pulverization feature of the flash pulverizer and the use of the vortex type of combustor, a heat release in excess of 1,500,000 B. t. u. per hour per cubic foot is attained.

Throttle control by varying solid fuel feed

It is well known that in the operation of gas turbines the power developed varies directly as the quantity of fuel fed to the combustor. By varying the quantity of fuel supplied to the combustor, the speed of the turbine is directly controlled, and without any appreciable lag, so that true throttle control, characteristic of gasoline engines, can be said to obtain. In the present system, this desirable throttle control can be secured by varying the solid fuel feed to the combustor.

Figure 7:
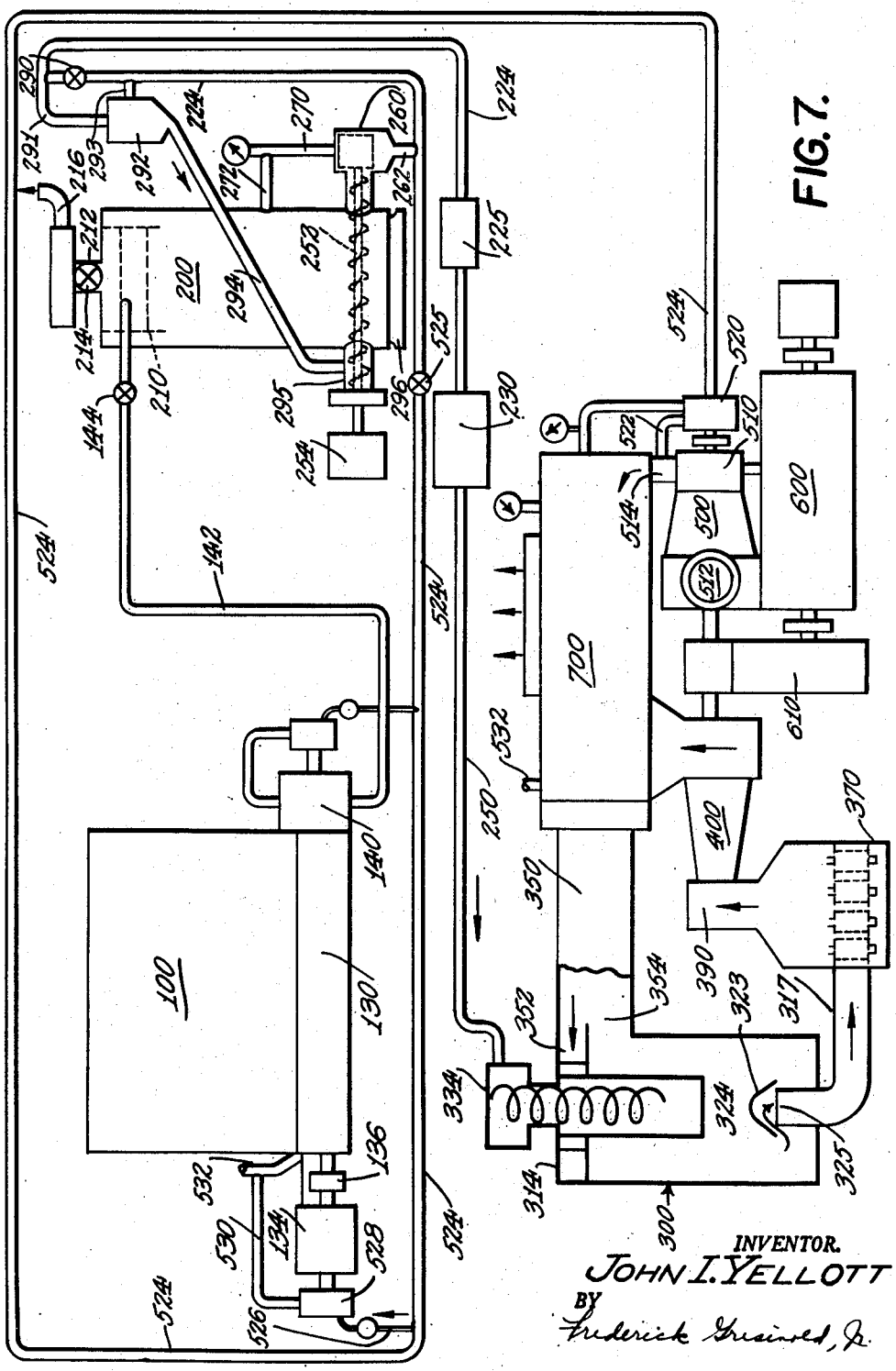
Fig. 7 is a diagrammatic showing of a coal-burning gas-turbine system including recirculator control elements for the fuel delivery system.

The system utilized is illustrated schematically in Fig. 7, in connection with the over-all system previously described. In this system, a recirculator control valve 290 is interposed in the comminuted fuel feed line 224 from the pressure storage tank or hoppers 200. A by-pass pipe 291 is connected in the feed line, on the down-stream side of the valve, and serves as an outlet for the cyclone separator 292. A second pipe 293, connects feed line 224, upstream of valve 290, with the separator 292. These connections establish a by-pass around valve 290, placing both the upstream and downstream segments of feed-line 224 in uninterrupted pneumatic and isobaric connection. The cyclone separator is connected through downcomer pipe 294 with a casing 295 formed as a housing for a rearward extension of feeder screw 252. While the feeder screw has been designated as 252, it will, of course, be appreciated that the other feeder screws 251 and 220 are susceptible of like treatment. With the main valve 525 open and variable speed motor 254 driving feed screw 252 being set in operation, the comminuted coal will be fed from the pressure storage 200 through hopper 260 and delivery pipe 262 into the air feed line 224. If valve 290 is closed, the stream of air-borne comminuted fuel will be by-passed through pipe 293 into cyclone 292, where the air is separated from the coal and delivered through pipe 291 into the downstream side of the feed-line, while the separated coal is returned through downcomer 294 and chamber 295 back into the tank 200, giving a cyclic course to the system. The air supplied to combustor feed pipe 224 is maintained constant in volume and pressure, and only the quantity or amount of coal delivered by the feed line is varied. As the control valve 290 is opened, the volume of air-borne coal which is recirculated through the cyclone and downcomer back to the container is progressively diminished. This connotes a progressive increase in the quantity of air-borne comminuted fuel which is passed through the recirculator control valve and down stream side of pipe 224, through meter 225, into coal pulverizer 230, delivery pipe 250, and combustor 300. While the pulverizer has been indicated as incorporated in the line 250, it will, of course, be understood that the flash-pulverizer may be directly incorporated in the inlet of the combustor as previously described. By the use of a meter 225, the air and coal flow can be accurately measured, and the locomotive driver given instant, instrument-board control of the system. Thus the control valve 290 may be suitably connected to the throttle so that the speed of the locomotive or of the gas turbine is directly responsive to its manipulation. Desirably the valve 290 may be of the quick-operating, gate-valve type, permitting operation from full throttle to idling speed to be made as rapidly as the throttle lever can be manipulated.

With the recirculator control valve wide open, the full quantity of comminuted coal delivered by the outlet pipe 262 into pipe 224 will be delivered to the pulverizer. As the valve is throttled down, the pressure on its upstream side increases, so that more coal carrying-fluid is forced through pipe 293 into the cyclone, where the coal contained therein is separated from the air. The cleaned air, freed of coal particles, passes upwardly through pipe 291, merging with the rest of the air and its diminished quantity of coal, so that the full quantity of air supplied to the downstream side of pipe 224, has its content of air-borne comminuted fuel varied according to the back-pressure set up on pipe 293, with consequent by-passing and removal of the fuel. The free-flowing, comminuted fuel discharge from the cyclone separator 292 into downcomer 294 will act as a plug, if present in sufficient volume, as will obtain when the system is throttled down, as indicated above. Thus, no back-pressure will be developed in the pressure tank 200, and the delivery of the comminuted coal from the container will depend solely on the aspiration thereof by the constant pressure stream of compressed air flowing in pipe 224. To insure closer control of the operation of the system, the fuel containers 200 may be provided with built-in weighing devices 296. These devices can be connected to automatic recording and control instruments on the instrument board of the locomotive. These instruments may include flow charts calibrated to read in terms of fuel discharge and train speed, thereby insuring that the driver has absolute control of the operation of this equipment, including the shift of comminuted coal feed from one tank to another. Of course, this shifting of fuel feed from one tank to the other can be entirely automatic and, to this end, the weighing devices 296 may be suitably coupled to the necessary shifting mechanisms for controlling valves 233 and 235, as well as the auxiliary air-feed valves.

To recapitulate, the by-pass or recirculatory control system described immediately above comprehends the delivery, under running conditions from idling speed to top speed, of a constant pressure stream of compressed air from the high pressure compressor to the coal pulverizer, the volume of fluid delivered being predetermined or regulated according to the meteorological conditions obtaining in the ambient atmosphere, that is as to temperature, air pressure, moisture, etc. In this constant volume and constant pressure stream of carrier fluid, varying quantities of air-borne, comminuted fuel are passed through the pulverizer into the combustor. This desirable result is attained by splitting the air stream bearing a fixed quantity or charge of fuel into two fractions, one of which retains its full quantum of comminuted fuel, and the other of which is substantially stripped of its solid fuel content and mixed with the first quantum to dilute the same, as to its solid fuel content, yet to maintain the carrying fluid itself constant in volume and pressure. Thus, the sole variable in the system here described is the actual quantity of comminuted fuel fed to the combustion system. Because of the fact that the combustion gases generated in the combustor depend on the quantity of fuel supplied, and because of the further fact that the speed of operation of the gas turbine varies directly as the volume of gaseous products of combustion delivered thereto, the power developed by the gas turbine is subject to substantially instantaneous throttle control. All of this without mechanical linkages and requiring but a single manipulation, namely that of the throttle, and not requiring the manipulation of any auxiliary control equipment. The use of constant volume, constant pressure air streams in the various parts of the system, and particularly in the input side of the combustor, permits the maintenance of the desirable 80 p. s. i. differential between the input and output sides of the atomizer. This assures the maintenance of a uniform condition of pulverization or flash disintegration of the comminuted fuel in the flash-pulverizer, and delivery of a uniformly dispersed, air-borne fuel charge into the combustor.

Where a constant pressure stream of carrier fluid is used in a system embodying no recirculator control, the amount of fuel solids delivered into the stream will be controlled directly by varying the speed of the variable-speed, screw-feed motor, as shown in the drawings. This system, as with a true recirculatory system, permits direct control of the speed by controlling the amount of fuel fed to the combustor. The immediate control in the present case is the control of the screw-feed motor which can be carried out as a throttle control, the auxiliary factors of air pressure, rate of flow and temperature being controlled by presetting of appropriate control instruments.

It will now be appreciated that there has been provided novel pressurized combustion systems for utilizing pulverized solid fuels in which the products of combustion of the system are fed, as motive fluid, into a gas turbine, mounted on a common shaft with a main compressor, and coupled to a generator or mechanical power translating mechanism. The necessary compressed air for maintaining the pressure combustion system with a pressure drop of the order of 80 p. s. i. between the feed to the combustor and the combustor chamber is supplied by a high pressure compressor. The waste heat from the regenerator is used in a suction fluid stream to transport and drive the raw fuel from a bunker, through a breaker or comminutor, to a comminuted fuel-storage chamber, where it is deaerated, and from whence it is transported, in a separate stream of high-pressure compressed air, delivered by a high pressure compressor, to the combustor feeding the gas turbine. The system herein has been shown to be particularly adapted for locomotive use, and the special assemblage of cooperating parts has been shown to have novel and desirable characteristics importing unpredictable efficiencies and operating factors in such use. Additionally, the power units herein have been shown to be adapted for use generally in marine installations and in power plants, particularly those located in localities where pure water is not available. Because of the fact that the system herein does not involve the use of water or steam as motive fluids, appreciable overall savings in equipment and installation and maintenance costs for the same are made possible.

Various modifications will occur to those skilled in the art in the composition, configuration and disposition of the component elements going to make up the invention as a whole as well as in the selection and combination of particular features for specific purposes, and no limitation is intended by the phraseology in the foregoing description or illustrations in the accompanying drawings except as indicated in the appended claims.

What is claimed is:

1. A solid fuel-fired gas turbine power plant comprising a combustor using pulverulent fuel, a fuel pulverizer discharging directly into the combustor, a fuel bunker, a fuel conveyor incorporating a comminuting means, the fuel bunker having sloping sides with a trough at its base into which the conveyor extends and from which it rises to deliver fuel to a second comminuted fuel receptacle; means for delivering heated air into the first said receptacle and conveying heated, dried, comminuted coal to the second said receptacle, the said air being vented to the atmosphere; and a second heated air supply for carrying comminuted coal from the said second receptacle to the fuel pulverizing means and combustor.

2. In a coal-fired gas-turbine plant, the combination with a gas turbine and its shaft of a compressor; a combustor for supplying heated gases to the turbine; a comminuted coal receptacle; conduit means discharging air from the compressor to deliver the comminuted coal from its receptacle through a convergent nozzle pulverizer into the combustor; and means in the combustor for delivering the combustion air to the pulverized fuel and cooling air to the combusted products of reaction of the fuel.

JOHN I. YELLOTT.

References Cited in the file of this patent

UNITED STATES PATENTS

| Number | Name | Date |
|---|---|---|
| 730,782 | Morrison | June 9, 1903 |
| 1,628,609 | Newhouse | May 10, 1927 |
| 2,055,385 | Noack | Sept. 22, 1936 |
| 2,058,051 | Bailey | Oct. 20, 1936 |
| 2,103,453 | Graemiger | Dec. 28, 1937 |
| 2,107,365 | Bray | Feb. 8, 1938 |
| 2,184,845 | Noack | Dec. 26, 1939 |
| 2,187,627 | Noack | Jan. 16, 1940 |
| 2,226,923 | Cross | Dec. 31, 1940 |
| 2,259,967 | Vogel-Jorgensen | Oct. 21, 1941 |
| 2,288,734 | Noack | July 7, 1942 |
| 2,305,785 | Jendrassik | Dec. 22, 1942 |
| 2,363,282 | Arnold | Nov. 21, 1944 |
| 2,407,165 | Kreitner | Sept. 3, 1946 |

FOREIGN PATENTS

| Number | Country | Date |
|---|---|---|
| 541,845 | Great Britain | Dec. 15, 1941 |
| 546,474 | Great Britain | July 15, 1942 |